United States Patent [19]
Jacobi

[11] 3,804,697
[45] Apr. 16, 1974

[54] MOVEABLE HEAT SEALING APPARATUS
[75] Inventor: William I. Jacobi, Northfield, Minn.
[73] Assignee: G. T. Schjeldahl Company, Northfield, Minn.
[22] Filed: Nov. 24, 1969
[21] Appl. No.: 879,199

[52] U.S. Cl. ............................................. 156/582
[51] Int. Cl. .......................................... B32b 31/00
[58] Field of Search ............ 156/582, 380, 544, 545

[56] References Cited
UNITED STATES PATENTS
2,348,803   5/1944   Friz ...................................... 156/544
3,065,121   11/1962  Andrews ........................... 156/544 X
3,269,884   8/1966   Slater .................................. 156/545

Primary Examiner—Samuel Feinberg

[57] ABSTRACT

A machine for heat sealing two sheets of material together, provided with a pair of cooperating heat wheels forming a sealing nip zone, a support for a sheet of material and supports for strips of sealing tape to be utilized in the sealing operation, together with an edge guide assembly to guide another sheet of material into proper position for joining to a sheet of material carried by the machine.

6 Claims, 6 Drawing Figures

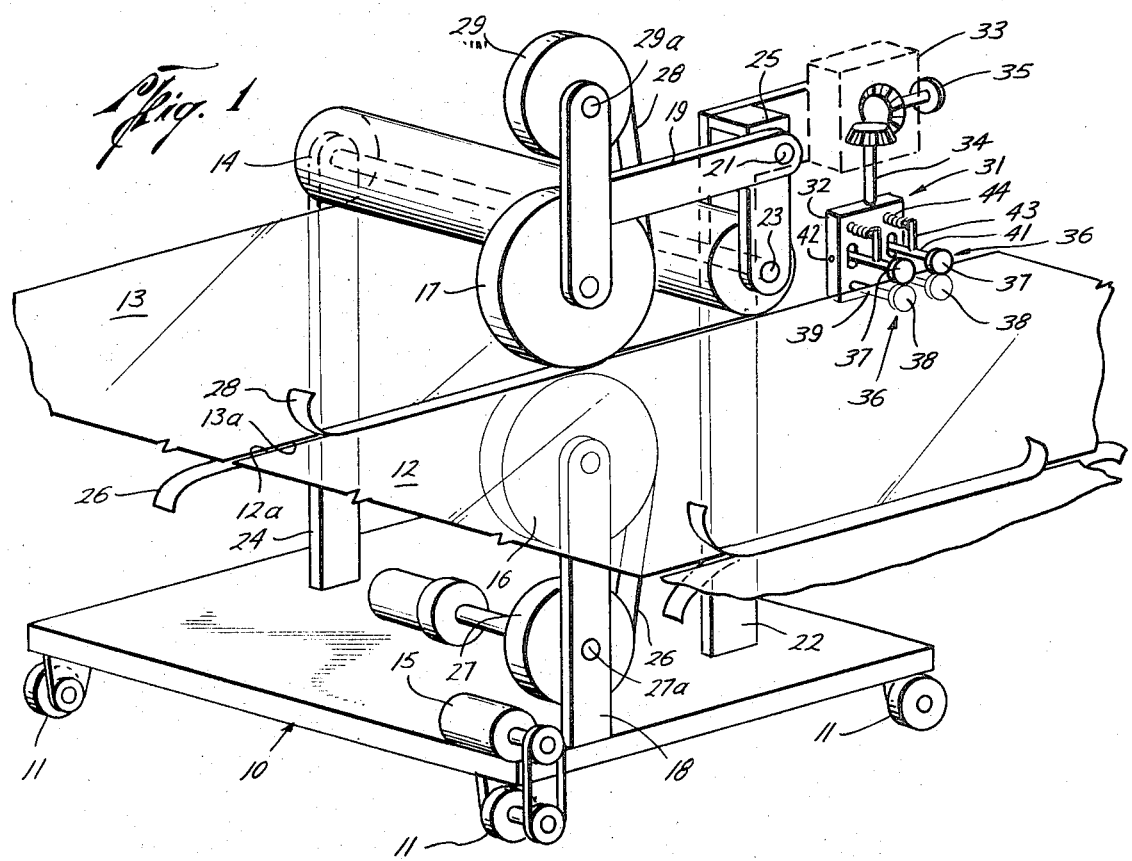

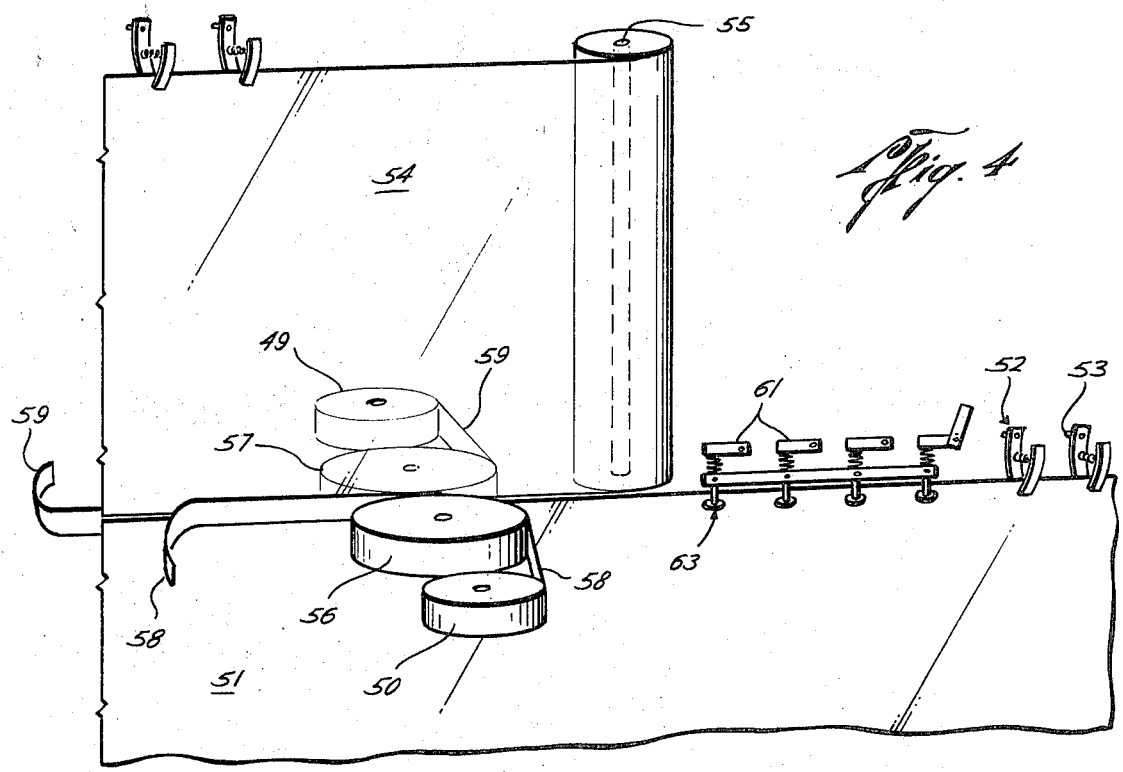
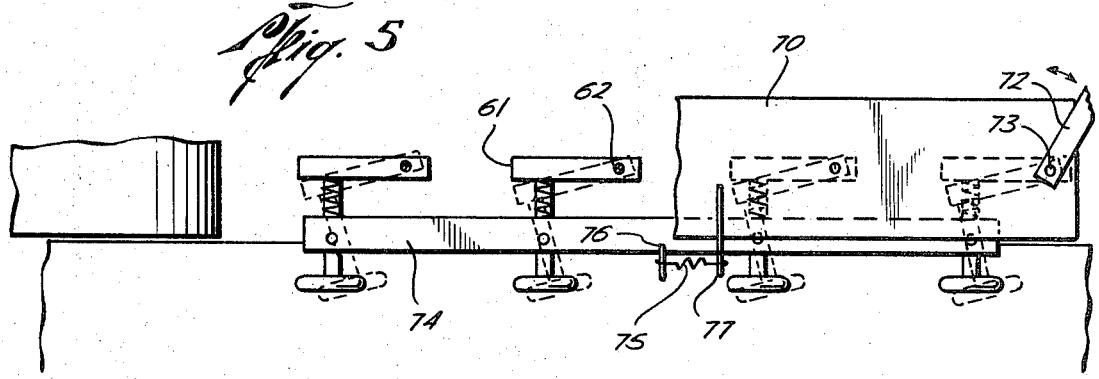
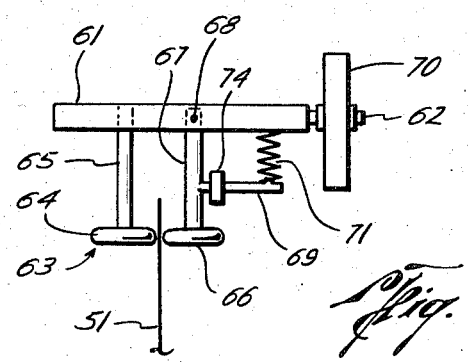

3,804,697

MOVEABLE HEAT SEALING APPARATUS

This invention relates to sealing apparatus and more particularly to a machine for sealing sheets of material together to form a liner which may be retained in place in a relatively large storage vessel such as a vessel for storing cryogenic liquids or the like.

It is an object of this invention to provide an apparatus for sealing two sheets of material together in which the edges of the two sheets of material are aligned in predetermined relationship as they pass between sealing wheels where they are sealed together.

Another object is to provide a machine which carries a first roll of material which is to be sealed to an elongated span of material extending for a considerable distance in which the two sheets of material have their edges aligned as they pass through the sealing wheels where they are sealed together.

Another object is to align the edges of two sheets of material, one being carried on a moving platform with the other remaining stationary, as the two sheets of material pass through sealing wheels where they are sealed together.

Other objects, features and advantages of this invention will be apparent from the specification, the drawings and the claims.

In the drawings wherein like numerals are utilized to indicate like parts,

FIG. 1 is a schematic illustration of an apparatus constructed in accordance with this invention;

FIG. 2 is a fragmentary view of the apparatus in FIG. 1 illustrating the manner in which the edge guide is moved to align a sheet of material;

FIG. 3 is an elevational view of a fragment of the machine of FIG. 1 illustrating the manner in which one edge guide wheel is lifted to position the material between the wheels of the edge guide assembly;

FIG. 4 is a schematic illustration of a machine for sealing material together as it is being applied to the inner wall of a storage tank;

FIG. 5 is a fragementary view of the machine of FIG. 4 illustrating the edge guide means and showing in dashed lines the movement of the edge guide rollers to change the position of material being sealed; and FIG. 6 is an elevational end view of one of the edge guide assemblies.

The machine illustrated in FIGS. 1 through 3 is particularly designed for sealing an edge of one strip of material taken from a supply roll to the edge of another strip or body of material which is already in place on the floor of a large tank or the like. Specifically, the machine may be utilized to join strips of material to a body of material to line the floor of a cryogenic tank such as shown in Smith Pat. No. 3,196,622.

The machine includes a platform indicated generally at 10 which is mounted on wheels 11 to provide for movement of the machine across the floor while a strip of material is being added to material already in place. The platform is moved across a floor by a suitable drive system, including a power source such as the motor 15. The material 12 represents a body of material in place on the floor of a tank to which a strip of material 13 from the supply roll 14 is being added.

The machine is provided with a pair of heat rollers 16 and 17 which seal the sheets of material 12 and 13 together. For a full disclosure of the type of heat wheels which may be utilized with this invention, reference is made to Pat. No. 3,269,884 which shows the construction and manner of operation of typical heat sealing wheels which may be utilized. The lower wheel 16 is mounted on a suitable standard or post 18 supported on the platform, and the upper wheel 17 is mounted on an arm 19 which is pivotally supported at 21 on a post 22, the base of which is mounted on the platform. This permits the upper wheel to be pivoted away from the lower wheel when desired to permit positioning of the strips 12 and 13 therebetween at the beginning of operation.

A shaft 23 is journaled for rotation on post 24 and arm 25 and supports the supply roll of material which is to be sealed to the span of material already in place. For sake of illustration, the material 12 and 13 is shown as being transparent. It will be understood that any of a variety of materials may be secured together by the machine shown, and in the event a cryogenic impermeable barrier is being prepared, a material such as described in the Smith Patent will be utilized.

The sheets of material 12 and 13 are preferably held with their edges 12a and 13a butted together in parallel relationship as shown in FIG. 1. In order to seal the two sheets together, a strip of sealing tape preferably fabricated from like material is disposed in sealing relationship to the edges of the sheets both above and below the joint. Such a strip of material for the underside of the sheet is shown at 26 and is supplied from spool 27 on arbor 27a. A like strip of material 28 is supplied from spool 29 on arbor 29a to be applied to the top of the top of the joint as illustrated in FIG. 1. Thus, as the machine moves along the floor, the strip of material 13 from the arbor 23 is unrolled and passes through the nip formed between heat rollers 16 and 17. The material 12 which has already been arranged in place on the base of the tank is temporarily elevated from the floor and while so elevated also passes through the nip of the heat wheels as the machine rolls along the floor. Simultaneously, the strips of material 26 and 28 are unrolled and pass through the heat wheels above and below the sheets 12 and 13. Heat from the sealing means provided by the pair of wheels 16 and 17 activate a suitable thermally responsive adhesive carried on the surface of the tape strips 26 and 28 to seal the strips to the sheets of material and also effect sealing of the strips to each other.

In accordance with this invention, means are provided for holding a sheet of material such as the sheet 12 in a position to pass through the sealing means provided by the nip formed between the two wheels 16 and 17 and thereby become sealed to the sheet of material 13 on the arbor 23. This holding means is indicated generally at 31 in FIG. 1.

The holding means indicated generally at 31 includes a mounting block 32 which is mounted on the platform for rotation about an axis which is substantially normal to the rotational axis of the arbor 23. In the preferred form, a gear box 33 is carried on the standard 22, and the mounting block 32 is supported on the shaft 34 extending from the gear box 33. The shaft 34 is rotated about its own axis by rotation of the control wheel 35.

At least one pair of rollers 36 are mounted on the block 32 and are adapted to engage the sheet of material 12 passing therethrough. In the illustrated embodiment, two pairs of rollers 36 arranged in tandem, are shown. Both pairs of rollers may be utilized or one may be removed depending on operating conditions.

The pairs of rollers 36 are identical and are mounted for rotation on an axis which is substantially parallel to the rotational axis of the arbor 23. Thus, as the machine moves across the floor, the operator may rotate the handle 35 to cut the rollers into or out of the line of travel of the sheet of material 12 to cause it to move toward or away from the block 32 and thus maintain it in the desired position for lying alongside of the material 13 as the two sheets of material pass in abutted relationship through the sealing means. This action is illustrated in FIG. 2, and it will be noted that with the mounting block 32 rotated to the position shown in FIG. 2 and with movement of the machine to the right as viewed in FIG. 1, the rotation of the rollers at an angle to the edge of the sheet of material 12 will cause the sheet of material to travel away from the mounting block and thus away from the edge of the sheet of material on the arbor 23. By proper position of shaft 34, the axis of rotation will tend to augment the above described action.

In order to permit ready placement of the material 12 in the holding means indicated at 31, the lower rollers 38 are journaled on fixed shafts 39, and the upper rollers 37 are journaled on shafts 41 which are mounted on horizontally extending pivots 42 to permit the shafts 41 to swing in a vertical plane. Each shaft is provided with an arm 43, and resilient springs 44 are held in compression between the arms 43 and the mounting block 32 to urge the rollers 37 toward the wheels 38. With this arrangement the upper rollers may be readily moved into an out-of-the-way position to permit insertion of the material 12 over the lower rollers, and then the upper rollers may be released to bear against the material 12 and guide it into proper relationship with the sheet of material 13 as the two sheets pass through the sealing machines.

Referring now to FIGS. 4 through 6, the sealing rollers, material, arbor and guide means for a wall sealing machine are illustrated. These parts are carried on a suitable platform which is arranged to be moved along the wall of a tank or other vessel structure such as that tank shown in the Smith patent to seal additional sheets to the edge of those sheets already in place and forming a cylindrical sleeve adjacent the tank wall. The wall and details of the platform are straightforward and omitted for purposes of clarity.

The sheet of material 51 represents a sheet of material which extends along the inner tank wall such as the tank shown in the Smith Patent, and this material is held in position by a plurality of clamps shown at 52. These clamps act in the manner of clothespins to seize the material 51. They may be held in place in any desired manner such as by pins 53 which may be inserted into the insulation material shown in the Smith patent.

The sheet of material 54 to be added to the material already in place is supported on the arbor 55. Both sheets of material 51 and 54 pass through the sealing means formed by the nip between the wheels 56 and 57. Sealing tapes 58 and 59 is applied on opposite sides of the sheets from reels 49 and 50 in the same manner as explained above in connection with the floor sealer shown in FIG. 1.

The means for holding the sheet of material 51 in proper position to pass through the sealing means includes a plurality of pairs of rollers supported on a plurality of mounting blocks 61, each of which is identical to the other. The mounting blocks 61 are journaled for rotation about pivots 62 in a supporting bar, a fragment of which is shown in FIG. 5 at 70. The bar 70, as well as the arbor 55 and the shafts for the several sealing rollers 56 and 57 and the tape reels 49 and 50, are all supported from a common platform, not shown.

As in the case of the floor sealer, the mounting blocks 61 are mounted for rotation about shafts 62 in such a manner that the rotational axis of the mounting blocks extends substantially normal to the rotational axis of the arbor 55.

At least one pair of rollers is provided on each mounting block, such pair being indicated generally at 63. The roller 64 is journaled for rotation about a shaft 65 which is fixed to the mounting block 61. Roller 66 is journaled for rotation about a shaft 67 which is mounted on a pivot 68 and permitted to swing about the axis of said pivot 68 toward and away from the roller 64. As in the case of the floor sealer, an arm 69 is provided on the shaft 67, and a resilient spring 71 is held in compression between the block and arm 69 to resiliently urge the roller 66 toward roller 64.

Since a plurality of mounting blocks 61 are provided, it is desired to move them all in unison. An operating handle 72 is non-rotatably mounted on shaft 73 which extends through the support bar 62. The associated mounting block 61 is also non-rotatably mounted on shaft 73 so that movement of handle 72 will result in movement of the associated mounting block. A tie rod 74 is rotatably supported on the arms 69 of each of the roller assemblies, and thus all of the mounting blocks will move about their pivots simultaneously as shown in dashed lines in FIG. 5 upon rotation of the handle 72.

As the several rollers are supporting sheet 51, the weight of the sheet will tend to rotate the mounting blocks about their respective pivot points in a clockwise position as illustrated in FIG. 5. As the machine will move from left to right as viewed in FIG. 4, rotation of the mounting blocks about their pivots due to the weight of the blocks and the material may result in the sheet 51 running out of the rollers if the attention of the operator were to be distracted. To avoid this possibility, the tie rod 74 is resiliently urged toward a neutral position by a spring 75. The spring 75 extends between an arm 76 on the tie rod 74 and an arm 77 on the member 70. The spring urges the tie rod to the right as viewed in FIG. 5 to return the several mounting blocks to their neutral position when the arm 72 is released.

To provide positive progress through the machine, a fluid coupling is attached to the sealing wheels. This allows the operator to control the "urge" on the material assuring a smooth sealing operation.

While the two machines illustrated are shown schematically, it will be understood that they may follow any desired design in which the relationship of the sealing wheels, the material, arbor and the aligning means 31 is maintained substantially as illustrated.

The wall sealing machine shown in FIGS. 4 through 6 may be supported on a suitable platform on any desired design for applying the material 54 to material in place about the wall of a tank.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. An apparatus for sealing first and second sheets of material together, comprising:

a platform;

sealing means mounted on the platform for sealing the first and second sheets of material together;

an arbor on the platform for supporting a roll of the first sheet material in a position to feed the first sheet through said sealing means;

and means for holding the second sheet of material in a position to pass through said sealing means and be sealed to the first sheet of material supported on said arbor, comprising:

a plurality of mounting blocks on said platform, each of which is mounted for rotation about an axis substantially normal to the rotational axis of said arbor;

a first tie rod links the rotatable mounting blocks together whereby rotation of one of said mounting blocks results in like rotation of all of the plurality of mounting blocks;

and at least one pair of rollers mounted on each of said blocks and adapted to engage the second sheet of material passing therethrough;

each of said rollers rotatable on an axis parallel to the rotational axes of the other of said rollers and substantially parallel to the rotational axis of said arbor;

whereby rotation of said plurality of mounting blocks will adjust the position of the edge of the second sheet passing through the plurality of pairs of rollers relative to the first sheet of material being fed from the arbor through the sealing means;

one roller of each of said pairs of rollers mounted for swinging movement toward the other roller of the pair, resilient means urges said one roller toward the other roller, and a second tie rod links the swinging rollers together, whereby movement of the second tie rod against the resilient means separates the rollers of each pair.

2. The apparatus according to claim 1 wherein at least one additional arbor is provided for supporting a sealing tape.

3. An apparatus for sealing two sheets of material together, comprising a platform;

sealing means mounted on the platform for sealing two sheets of material together;

an arbor on the platform for supporting a roll of sheet material in a position to feed the sheet through said sealing means;

and means for holding a sheet of material in a position to pass through said sealing means and be sealed to a sheet of material on said arbor, comprising a mounting block on said platform mounted for rotation about an axis substantially normal to the rotational axis of said arbor;

and at least one pair of rollers mounted on said block and adapted to engage a sheet of material passing therethrough;

each said roller rotatable on an axis substantially parallel to the rotational axis of said arbor;

whereby rotation of said mounting block will adjust the position of the edge of a sheet passing through the rollers relative to a sheet of material being fed from the arbor through the sealing means;

one of said rollers of each pair being resiliently urged toward the other.

4. The apparatus of claim 3 wherein a plurality of mounting blocks are provided on parallel axes and each mounting block carries a pair of rollers mounted for rotation on axes parallel to the rotational axis of the other rollers and adapted to engage a sheet of material passing therethrough.

5. The apparatus of claim 4 wherein a tie rod links the several mounting blocks and rotation of one block results in like rotation of all mounting blocks.

6. The apparatus according to claim 3 wherein at least one additional arbor is provided for supporting a sealing tape.

* * * * *